US012775651B2

(12) United States Patent
Hoppe

(10) Patent No.: US 12,775,651 B2
(45) Date of Patent: Oct. 27, 2026

(54) METHOD AND DEVICE FOR PRE-SELECTING AND DETERMINING SIMILAR DOCUMENTS

(71) Applicant: Fraunhofer-Gesellschaft zur Förderung der angewandten Forschung e.V., Munich (DE)

(72) Inventor: Thomas Hoppe, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 18 days.

(21) Appl. No.: 17/636,438

(22) PCT Filed: Aug. 20, 2020

(86) PCT No.: PCT/EP2020/073304
§ 371 (c)(1),
(2) Date: Feb. 18, 2022

(87) PCT Pub. No.: WO2021/032824
PCT Pub. Date: Feb. 25, 2021

(65) Prior Publication Data

US 2022/0292123 A1 Sep. 15, 2022

(30) Foreign Application Priority Data

Aug. 20, 2019 (DE) ..................... 10 2019 212 421.6

(51) Int. Cl.
*G06F 16/334* (2025.01)
*G06F 16/31* (2019.01)
(Continued)

(52) U.S. Cl.
CPC ........ *G06F 16/3347* (2019.01); *G06F 16/319* (2019.01); *G06F 16/35* (2019.01); *G06F 40/284* (2020.01)

(58) Field of Classification Search
CPC .. G06F 16/3347; G06F 16/335; G06F 16/319; G06F 16/35
See application file for complete search history.

(56) References Cited

U.S. PATENT DOCUMENTS

| | | |
|---|---|---|
| 4,839,853 A | 6/1989 | Deerwester et al. |
| 6,112,202 A | 8/2000 | Kleinberg |

(Continued)

FOREIGN PATENT DOCUMENTS

| | | |
|---|---|---|
| CN | 108491462 A | 9/2018 |
| DE | 10029644 A1 | 1/2002 |

(Continued)

OTHER PUBLICATIONS

Readdit-r/MachineLearning [How is word2vec different from Vector space model used in inverted indexing? [newbie question]]. https://www.reddit.com/r/MachineLearning/comments/3jr02d/how_is_word2vec_different_from_vector_space_model/; Dated: Sep. 5, 2015-Sep. 7, 2015 (Year: 2015).*

(Continued)

*Primary Examiner* — Amanda L Willis
(74) *Attorney, Agent, or Firm* — The Webb Law Firm

(57) ABSTRACT

Provided is a method and apparatus for pre-selecting and determining similar documents from a set of documents having tokenized character strings. Calculating an inverted index for at least one subset of the documents that have the tokenized character strings. Calculating word embeddings for the tokenized character strings of the at least one subset of the documents. Calculating a respective document embedding for the at least one subset of the documents by adding word embeddings of the tokenized character strings. Calculating SimSet groups of similar tokenized character strings via a clustering method. Performing a query expansion and retrieving with the query expansion, documents from the inverted index in order to quantitatively limit the (Continued)

number of document embeddings to be compared. Comparing the query embedding with the document embeddings of the documents preselected using the SimSet groups to automatically determine a ranking for the similarity.

11 Claims, 8 Drawing Sheets

(51) Int. Cl.

| | |
|---|---|
| ***G06F 16/35*** | (2025.01) |
| ***G06F 40/284*** | (2020.01) |

(56) References Cited

U.S. PATENT DOCUMENTS

| | | | | |
|---|---|---|---|---|
| 6,189,002 | B1 * | 2/2001 | Roitblat | G06F 16/313 707/E17.084 |
| 6,285,999 | B1 | 9/2001 | Page | |
| 6,847,966 | B1 * | 1/2005 | Sommer | G06F 16/3347 707/999.005 |
| 8,938,463 | B1 | 1/2015 | Kim et al. | |
| 9,767,165 | B1 * | 9/2017 | Tacchi | G06F 16/9535 |
| 2006/0271584 | A1 | 11/2006 | Barsness et al. | |
| 2007/0208726 | A1 | 9/2007 | Krishnaprasad et al. | |
| 2008/0156142 | A1 | 7/2008 | Deng | |
| 2008/0263023 | A1 * | 10/2008 | Vailaya | G06F 16/334 707/999.005 |
| 2008/0270384 | A1 | 10/2008 | Tak | |
| 2009/0076839 | A1 | 3/2009 | Abraham-Fuchs et al. | |
| 2010/0036797 | A1 | 2/2010 | Wong et al. | |
| 2010/0161601 | A1 | 6/2010 | Gruber | |
| 2013/0054563 | A1 | 2/2013 | Heidasch | |
| 2013/0054589 | A1 | 2/2013 | Cheslow | |
| 2017/0011289 | A1 | 1/2017 | Gao et al. | |
| 2018/0113938 | A1 | 4/2018 | Piramuthu et al. | |
| 2018/0336241 | A1 | 11/2018 | Noh et al. | |
| 2019/0286704 | A1 | 9/2019 | Volkovs et al. | |
| 2021/0349889 | A1 | 11/2021 | El Kaed et al. | |
| 2022/0292123 | A1 | 9/2022 | Hoppe | |

FOREIGN PATENT DOCUMENTS

| | | | | |
|---|---|---|---|---|
| DE | 102019212421 | A1 | 2/2021 | |
| EP | 0687987 | * | 12/1995 | G06F 17/30 |
| EP | 2045728 | A1 | 4/2009 | |
| EP | 2199926 | A2 | 6/2010 | |
| EP | 2199926 | A3 | 7/2010 | |
| EP | 2400400 | A1 | 12/2011 | |
| EP | 2562695 | A2 | 2/2013 | |
| KR | 1020180058449 | A | 6/2018 | |
| WO | 2008027503 | A2 | 3/2008 | |
| WO | 2008131607 | A1 | 11/2008 | |
| WO | 2017007740 | A1 | 1/2017 | |
| WO | 2017173104 | A1 | 10/2017 | |
| WO | 2018126325 | A1 | 7/2018 | |
| WO | WO-2018208514 | A1 * | 11/2018 | G06F 16/3322 |

OTHER PUBLICATIONS

Worth [Word Embeddings and Semantic Spaces in Natural Language Processing]; International Journal of Intelligence Sicence, 2023, 13, 1-21; chrome-extension://efaidnbmnnnibpcajpcglclefindmkaj/https://www.scirp.org/pdf/ijis_2023011614592013.pdf (Year: 2022).*

CrossValidated [Do word vectors obtained via word embedding techniques really form a vector space]; https://stats.stackexchange.com/questions/206144/do-word-vectors-obtained-via-word-embedding-techniques-really-form-a-vector-spac; Apr. 7, 2016-Jan. 31, 2024 (Year: 2016).*

LittleDino; "Introduction to K-means clustering" Medium.com; Apr. 29, 2022; https://medium.com/@24littledino/introduction-to-k-means-clustering-976dc34fc4d5 (Year: 2022).*

Bengio et al., "A Neural Probabilistic Language Model", Journal of Machine Learning Research, 2003, pp. 1137-1155, vol. 3.

Blei et al., "Latent Dirichlet Allocation", Journal of Machine Learning Research, 2003, pp. 993-1022, vol. 3.

Blondel et al., "Fast unfolding of communities in large networks", Journal of Statistical Mechanics: Theory and Experiment, 2008, 12 pages.

Camacho-Collados et al., "From Word to Sense Embeddings: A Survey on Vector Representations of Meaning", Journal of Artificial Intelligence Research, 2018, pp. 743-788, vol. 63.

Lashkari et al., "Neural Embedding-based Indices for Semantic Search", Information Processing & Management, 2018, pp. 733-755, vol. 56:3.

Le et al., "Distributed Representations of Sentences and Documents", Proceedings of the 31st International Conference on Machine Learning, 2014, 9 pages, vol. 32.

Mannes, "Facebook's Artificial Intelligence Research lab releases open source fastText on GitHub", Aug. 18, 2016, 2 pages, retrieved from https://techcrunch.com/2016/08/18/facebooks-artificial-intelligenceresearch-lab-releases-open-source-fasttext-on-github/.

Manning et al., "An Introduction to Information Retrieval", Cambridge University Press, Apr. 1, 2009, 569 pages.

Mikolov et al., "Efficient Estimation of Word Representations in Vector Space", 2013, 12 pages, retrieved from https://arxiv.org/abs/1301.3781.

Mitra et al., "Neural Models for Information Retrieval", Cornell University Library, 2017, 52 pages, retrieved from arxiv.org.

Pennington et al., "GloVe: Global Vectors for Word Representation", Proceedings of the 2014 Conference on Empirical Methods in Natural Language Processing (EMNLP), Oct. 25-29, 2014, pp. 1532-1543.

Radovanović et al., "On the Existence of Obstinate Results in Vector Space Models", Proceeding of the 33rd International ACM SIGIR Conference on Research and Development in Information Retrieval, Jul. 19-23, 2010, 8 pages.

Salton, "Automatic text processing: The transformation, Analysis, and Retrieval of Information by Computer", Reading: Addison-Wesley, 1989, pp. 229-312.

Sidorov et al., "Soft Similarity and Soft Cosine Measure: Similarity of Features in Vector Space Model", Computaciön y Sistemas, 2014, pp. 491-504, vol. 18:3.

Zamani et al., "Estimating Embedding Vectors for Queries", In: Proceedings of the 2016 ACM International Conference on the Theory of Information Retrieval, 2016, pp. 123-132.

Zhong et al., "Conceptual Graph Matching for Semantic Search", In: Priss, U et al. (eds) Conceptual Structures: Integration and Interfaces. ICCS 2002. Lecture Notes in Computer Science, 14 pages, vol. 2393.

Goikoetxea et al., "Random walks and neural network language models on knowledge bases", Proceedings of the 2015 conference of the North American Chapter of the Association for Computational Linguistics: Human language technologies 2015, pp. 1434-1439.

Hoppe et al., "Guide for Pragmatical Modelling of Ontologies in Corporate Settings", In Semantic Applications: Methodology, Technology, Corporate Use, 2018, pp. 13-30.

Hoppe et al., "Ontology-based entity recognition and annotation", 2020.

Hoppe, "Semantische Suche", Springer Vieweg, 2020, ISBN 978-3-658-30426-3.

Kacmajor et al., "Semantic relatedness and taxonomic word embeddings", arXiv preprint arXiv:2002.06235, 2020.

Maldonado et al., "Size matters: The impact of training size in taxonomically-enriched word embeddings", Open Computer Science, 2019, pp. 252-267, vol. 9.

Wittgenstein, "Philosophical investigations", John Wiley & Sons, 2009.

* cited by examiner

Dokument: A police officer is an official

Word Embeddings a [1.018, 1.083, -3.313, 1.511, -0.017, 2.057, 1.152, 0.306, -3.382, -2.290]

police officer : [0.561, -0.833, -0.017, -0.213, 0.106, 0.508, 0.432, -0.619, 0.558, -1.099]

is : [-0.785, 2.756, -3.063, 2.551, 2.918, -2.150, -4.965, -0.373, 1.646, -4.197]

official : [0.925, 0.063, 0.319, -0.203, -0.345, 0.546, 0.731, -0.185, 1.015, -0.881]

Document Embedding

A police officer is an official

[0.430, 0.767, -1.519, 0.912, 0.665, 0.241, -0.663, -0.218, -0.041, -2.117]

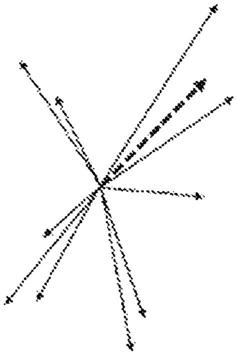
Fig. 4A
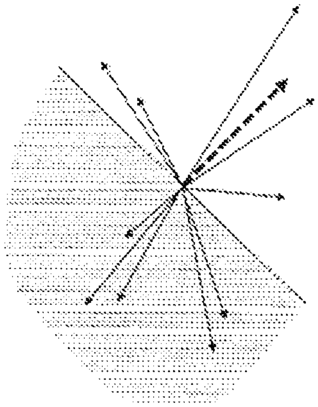
Fig. 4B
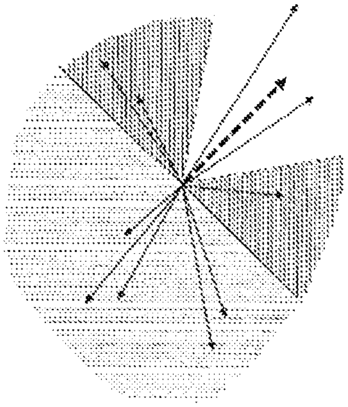
Fig. 4C
Fig. 4D
| | a | police officer | is | official |
|---|---|---|---|---|
| a | 1 | 0.1222 | | |
| police officer | 0.1222 | 1 | -0.0233 | 0.7533 |
| is | 0.1778 | -0.0233 | 1 | -0.1368 |
| official | 0.0122 | 0.7533 | -0.1368 | 1 |
SimSet group {police officer , official }

METHOD AND DEVICE FOR PRE-SELECTING AND DETERMINING SIMILAR DOCUMENTS

CROSS-REFERENCE TO RELATED APPLICATIONS

This application is the United States national phase of International Application No. PCT/EP2020/073304 filed Aug. 20, 2020, and claims priority to German Patent Application No. 10 2019 212 421.6 filed Aug. 20, 2019, the disclosures of which are hereby incorporated by reference in their entirety.

BACKGROUND OF THE INVENTION

Field of the Invention

The disclosure relates to a method for determining similar documents and to a corresponding apparatus.

Description of Related Art

Search functions and methods provide basic functionalities of operating systems, database systems and information systems that are used in particular in content and document management systems, information retrieval systems of libraries and archives, search functions of web presentations on intranets and extranets. These search functions and methods relate to electronic documents (simply called documents below), at least some of which have a text and which are created in or converted to file form through digitization (conversion to a binary code).

Without search functions, searching extensive document collections, such as e.g. patent specifications, would be almost unmanageable.

Search functions, methods and engines are based on IT principles of information and document retrieval (Introduction to Information Retrieval, Christopher D. Manning, Prabhakar Raghavan and Hinrich Schütze, Cambridge University Press, 2008), such as e.g. algorithms for conversion and syntactic analysis of documents, efficient data structures for indexing the document content, access algorithms optimized for these index structures, the avoidance of repeated calculation through buffer-storage of results (so-called caching) (see DE10029644) and measurement methods that can be used to measure the degree of match (referred to as "relevance") of documents with regard to a search query.

Conventional methods of information retrieval for unstructured, textual information rate the "relevance" of documents on the basis of the occurrence of search terms by using statistical, probabilistic and information-theoretic ratings.

A fundamental characteristic of search engines is the interpretation of the type of combination of entered keywords. Two types of combination have become established in practice: AND and ANDOR.

AND results in only documents that include all of the search terms being searched. ANDOR, on the other hand, results in the search query being interpreted as disjunctively combined, but the result documents are weighted on the basis of the number of search terms found per document, so that it is still possible to find similar documents too.

These conventional methods are generally based on term vectors, which symbolically represent documents as vectors in a high-dimensional space (e.g. with thousands to hundreds of thousands of dimensions). Each dimension of such a vector space represents a word in this instance. All dimensions taken together form the orthonormal basis of the vector space.

File vectors, or document vectors, are formed as a linear combination of the word frequencies or normalized word frequencies over the orthonormal basis in this instance.

As documents generally consist of only a fraction of all possible words, document vectors are a) generally "sparse" (only thinly occupied, many of the vector components are zero),
b) discrete (each dimension captures only the meaning of a word) and
c) this representation solely by using the structure of high-dimensional spaces tends to produce "obstinate" documents (documents that are found as results for a wide variety of queries). (On the existence of obstinate results in vector space models, Milos Radovanovic, Alexandros Nanopoulos, Mirjana Ivanovic, Proceeding of the 33rd International ACM SIGIR Conference on Research and Development in Information Retrieval, SIGIR 2010, Geneva, Switzerland, Jul. 19-23, 2010, DOI: 10.1145/1835449.1835482).

In particular the discrete character of this symbolic representation leads to words with similar meanings being mapped to mutually independent dimensions of the orthonormal basis and hence to independent components of the document vectors.

In order to take term dependencies into consideration, this form of representation therefore requires additional knowledge to be used in order to enrich the document vectors with information about similar terms and the degree of these term similarities.

So-called semantic search methods determine the topics on which the documents are based on a probability basis (U.S. Pat. No. 4,839,853, Latent dirichlet allocation. David M. Blei, Andrew Y. Ng, Michael I. Jordan In: *Journal of Machine Learning Research*, No 3 (2003), pages 993-1022, http://jmlr.csail.mit.edu/papers/v3/blei03a.html (last access Feb. 6, 2019) and its variants) or determine similarities between documents on the basis of explicitly predefined knowledge models, in the form of term models (linguistic models, semantic networks, word networks, taxonomies, thesauri, topic maps, ontologies, knowledge graphs).

The topics determined by the first group of semantic search methods, also referred to as topic modeling methods, generally have an artificial effect, are rarely interpretable by human beings and often generate barely attributable search results.

The second form of semantic search methods uses predefined knowledge models in order to map the documents and queries to a common controlled vocabulary defined by the knowledge model [EP 2199926 A3/US 000008156142 B2] and hence to simplify the search. The representations of documents to the knowledge model are referred to as annotations, which may be enriched with additional terms of the knowledge model by way of term similarities.

In order to determine the terms with which an annotation needs to be additionally enriched, knowledge models are used in order to determine that synonymous terms imply one another, that subterms imply their generic terms or terms that are in other relationships with one another. The degree of term similarity can be determined from the knowledge models on the basis of semantic distance (Conceptual Graph Matching for Semantic Search. Zhong J., Zhu H., Li J., Yu Y. In: Priss U., Corbett D., Angelova G. (eds) Conceptual Structures: Integration and Interfaces. ICCS 2002. Lecture Notes in Computer Science, vol. 2393. Springer, Berlin, Heidelberg) or the length of these implication chains.

The set of annotations, extended by such additional terms, corresponds to an enrichment of the document vector consisting of the annotations by further vector components determined from the term similarities.

Search methods based on term models are the most widely used form of semantic search at present as a result of the high quality of the search results and the potential explainability of the results on the basis of the network structure [EP2562695A3, EP2045728A1, EP2400400A1, EP2199926A2, US20060271584A1, US20070208726A1, US20090076839A1, WO2008027503A9, WO2008131607A1, WO2017173104].

This last type of semantic search method has several associated disadvantages, however 1) The methods are dependent on explicitly predefined term models.
2) If these models do not exist for a field of application, they first need to be modeled.
3) The quality of the search results is moreover dependent on the quality of these models.
4) This model dependency means that these semantic search methods cannot be transferred to other fields of application.
5) These methods generally fail in the event of typing errors and terms that are not included in the term models.
6) Since misspelled terms are generally not part of the term models and unknown terms cannot be part of the term models, these methods need to be complemented by additional methods for detecting or correcting spelling mistakes and by conventional full-text search.

The addressed problem of "semantic information retrieval on the basis of word embeddings" (SIR) therefore consists in providing a search function that operates without explicitly predefined background knowledge. The search should be performed over any set of documents as efficiently as conventional information retrieval methods. It should output suitable documents in a manner sorted according to their similarity, in light of the similarity of the terms used therein. And it should limit the number of results so that only documents that are actually comparable are examined. Furthermore, the determined results should be comprehensible to a user. And the solution should also be able to be used for comparison with a user profile formulated using terms in the documents and for comparing documents among one another.

The principle of word embedding is known. Known methods, e.g. Word2Vec (including its variants Paragraph2Vec, Doc2Vec etc.) GloVe and fastText, determine the semantics of individual words/terms and can therefore replace explicitly predefined term models. Coherent character strings (alphanumeric characters, hyphen) can be understood as words of a language. A term can be regarded as a superset of words that can comprise still further punctuation marks or printable special characters or can consist of multiple related words and terms.

In this regard, reference will be made to the following sources.

Word2Vec: Efficient Estimation of Word Representations in Vector Space, Tomas Mikolov, Kai Chen, Greg Corrado, Jeffrey Dean, https://arxiv.org/abs/1301.3781 (last access Feb. 6, 2019).

GloVe: Global Vectors for Word Representation, Jeffrey Pennington, Richard Socher, Christopher D. Manning, Proceedings of the 2014 Conference on Empirical Methods in Natural Language Processing (EMNLP), pages 1532-1543, Oct. 25-29, 2014, Doha, Qatar).

fastText: Facebook's Artificial Intelligence Research lab releases open source fastText on GitHub, Mannes, John, https://techcrunch.com/2016/08/18/facebooks-artificial-intelligence-research-lab-releases-open-source-fasttext-on-github/(last access Feb. 6, 2019).

These methods are based on continuous—as opposed to discrete—term vectors (A Neural Probabilistic Language Mode, Yoshua Bengio, Réjean Durcharme, Pascal Vincent, Christian Jauvin; Journal of Machine Learning Research 3 (2003) 1137-1155).

These methods involve terms/words being represented by a lower-dimensional numerical vector that generally comprises only a few hundred dimensions but that, in contrast to a discrete term vector, uses all of the vector components. Whereas in the case of discrete representation the individual dimensions correspond to the orthonormal basis of the vector space, and therefore represent terms symbolically, and documents are represented as a linear combination of the orthonormal vectors, continuous representation involves words being represented as points (or vectors) in a space whose orthonormal basis can be interpreted as a subsymbolic representation of latent meanings (the words are embedded in the space of latent meanings, so to speak).

Words and documents in discrete representation are, as a result of the "sparseness", situated on the hyper-edges and hyper-surfaces of a high-dimensional space, but generally in the middle of the space, or its low-dimensional subspaces, in the case of continuous representation.

In order to determine the positions of the words in the vector space of continuous representation, the word embedding methods described above use unsupervised machine learning methods.

These learning methods use the context of words in the texts of a text corpus—that is to say the surrounding words of said texts—to determine the position of the word in the vector space.

This has the effect that terms that occur in identical or comparable contexts in texts end up in close spatial proximity in the vector space (see illustration in FIG. 1).

From the word embeddings trained in this manner, it is possible to determine terms having similar content by way of different measures of distance, such as e.g. Euclidean distance or cosine distance.

Another measure is so-called cosine similarity (see Manning et al. above), which is used to determine the similarity of vectors by way of the scalar product thereof.

Cosine similarity A can be used to determine whether two vectors point in the same direction (A=1), point in similar directions (0.7<A<1), are orthogonal (A=0) or point in opposite directions (−1<=A<0).

Whereas the cosine similarity A of conventional term vectors can be only in the range [0, 1], it can be in the range [−1, 1] in the case of word embeddings.

Doc2Vec or Paragraph2Vec (Distributed Representations of Sentences and Documents, Quoc Le, Tomas Mikolov Proceedings of the 31$^{st}$ International Conference on Machine Learning, Beijing, China, 2014. JMLR: W&CP volume 32. https://cs.stanford.edu/-quocle/paragraph_vector.pdf (last access Feb. 6, 2019)) extends the approach of Word2Vec by taking into consideration document identifiers used as separate terms during training. These identifiers are, like other terms, also embedded in the same vector space and can be distinguished from words only on the basis of the syntax of their descriptors.

By contrast, documents and queries are represented in the SIR method by linear combination of the word embeddings of their words and are represented in a separate document space of the same dimensionality. Document embeddings and query embeddings are generated in this instance by addition of all of the word embeddings of the words of a document, or a query, and subsequent normalization for the document length, or query length. A query embedding vector is known from Zamani, Croft; Estimating embedding vectors for queries, in Proceedings of the 2016 ACM International Conference of the Theory of Information Retrieval, pages 123-132, DOI, 10.1145/2970398.2970403.

Whereas the Word2Vec approach and the Doc2Vec approach regard the words to be represented as atomic, the fastText approach (see Facebook's Artificial Intelligence above) goes a step further and represents words by using the set of their N-grams (the set of all sequences of N successive partial character strings of the word). This extension also allows morphological similarities of words (such as prefixes, suffixes, inflections, plural forms, variant spellings, etc.) to be included as well in the calculation of the position of the word vectors, with the result that the position of previously unknown words ("out-of vocabulary" terms) in the vector space can also be determined. The fastText approach therefore has a limited degree of tolerance toward spelling mistakes and unknown words.

Owing to the fastText approach of using N-grams, an approach based thereon admittedly has a certain level of tolerance toward spelling mistakes and unknown words. However, it is not sensitive to well-formed words and permits even nonsensical combinations of characters to still be made comparable so long as they include at least one N-gram that also occurs in the training set.

The main problem of these approaches, however, is that when words are represented in a continuous, sub-symbolic vector space, each word is at a distance from all the others and all of the words are similar to one another, albeit to different degrees.

By way of example, the word "car" will be in close spatial proximity to "automobile" and "motor vehicle", or the angle thereof will be small and hence the cosine similarity thereof will be large; the distance will increase, the angle will become larger and the cosine similarity will become smaller from "vehicle", "means of transport" and "aircraft", but this word will also be at a distance from the words "chicken stock", "slicing", "velvety", "keelhaul" and "Ouagadougou" and will form a very large angle in relation to the vectors thereof.

A criterion that can be used to distinguish the "most similar" terms from the "dissimilar" terms is therefore lacking.

If the word embeddings of the words of a query or of a document are combined as described to produce query or document embeddings, this problem is carried forward: all documents are similar to all other documents and a query is similar to all documents, but to different degrees in each case.

The publication Soft Similarity and Soft Cosine Measure: Similarity of Features in Vector Space Model". Sidorov, Grigori; Gelbukh, Alexander; Gómez-Adorno, Helena; Pinto, David, *Computación y Sistemas.* 18 (3):491-504. doi:10.13053/CyS-18-3-2043. (last access Feb. 6, 2019) has presented the measure "soft cosine similarity", which permits an additional weighting factor to be included in the offsetting of the vector components of cosine similarity.

This weighting factor can be used to include the similarity of individual words in the calculation of the similarity of document vectors. In principle, the word similarity used could be the cosine similarity of word embeddings. However, this is prohibited for a search function at runtime for reasons of efficiency, since calculating the scalar product of the document vectors would require every word of a document or of an query to be compared with all of the words of another document.

Although calculating the word similarities in advance allows this to be avoided at runtime, calculation in advance entails a quadratic complexity with $n*(n-1)/2$ comparisons.

Even if, given a vocabulary of 100,000 words, each calculation were to require only a millisecond, calculating all similarities would require around 57.9 h. Although it would be possible to parallelize the calculation, this would require additional hardware.

A method based on "soft cosine similarity" would also suffer from the problem "everything is similar to everything to different degrees".

While a purely Boolean retrieval function (see Manning et al. above) can use the hard criterion of a term being included in a document to limit the number of documents to those that include the term, no approach based on term similarities provides an analogous hard criterion.

Although KR102018058449A describes a system, and a method, for semantic search by word vectors that is apparently also based on a similarity measure related to cosine similarity, it is still unclear whether this method is designed for discrete term vectors or continuous word embeddings. The supposition is obvious that this approach is subject to the similarity problems described and returns all documents.

US20180336241A1 describes a method for calculating the similarity of search queries relating to job titles that calculates query and document vectors from word embeddings, and a search engine that, being limited to the field of application of searching for job titles, is used to determine similar job openings. The specific design of the search engine is not described, and there is also neither a discussion of the similarity problems nor a description of how the quantity of search results can be limited.

WO2018126325A1 describes an approach to learning document embeddings from word embeddings using a convolutional neural network. Document embeddings of the proposed solution are calculated by linear combination of word embeddings, on the other hand.

WO2017007740A1 describes a system that uses contextual and, in contrast to the structural N-grams of fastText, morphological similarities in a specific form of "Knowledge powered neural NETwork" (KNET) in order to deal with rare words or words that do not occur in the document corpus. KNET can be regarded as an alternative approach to the use of Word2Vec, GloVe or fastText in the proposed solution.

US20180113938A1 describes a word-embeddings-based recommender system for (semi)structured data. The determinement of document embeddings follows a different principle. The similarity problems are not addressed here either.

SUMMARY OF THE INVENTION

The object is achieved by a method having features as described herein. This involves using documents that have tokenized character strings.

In a first step, an indexing method is used to calculate an inverted index (also called inverse index) for at least one subset of the documents. That is to say that a file or data structure is created that indicates for each tokenized character string which documents include said character string.

Word embeddings are then calculated for the at least one subset of the documents, i.e. the character strings are mapped to a vector of real numbers.

A respective document embedding is then calculated for the at least one subset of the documents by adding the word embeddings of all of the character strings, in particular words of the document, for each document and normalizing said word embeddings with the number of character strings, in particular words, wherein beforehand, subsequently or at the same time the calculated word embeddings are used to calculate SimSet groups of similar character strings by using a clustering method.

A query expansion is then performed in a query phase, said query expansion involving i) query terms that occur in SimSet groups, or ii) query terms that do not occur in the SimSet groups but do occur in the documents, or iii) query terms that do not occur in the documents, in particular including misspelt query terms, being used for a preselection (in particular by the inverted index for the subset of the documents) of the documents, in order to limit the quantity of hits. A query embedding is then performed.

The query embedding is then compared with the document embeddings of the documents preselected using the previously calculated SimSet groups in order to quantitatively limit the number of document embeddings to be compared, so as to automatically determine a ranking for the similarity of the documents and to display and/or store said documents. This ranking can be used e.g. to determine the documents most similar to the query or to another document.

It will be noted that SimSet groups do not comprise documents, but rather words.

In one embodiment, a CBOW model or a Skip-gram model is used for the word embedding.

In a further embodiment, a nonparameterized clustering method is used, with the result that no a-priori assumptions need to be made. The clustering methods that can be used in this case are hierarchic methods, in particular divisive or agglomerative clustering methods. It is also possible for the clustering method to be in the form of a density-based method, in particular DBSCAN or OPTICS. Alternatively, the clustering method can be in the form of a graph-based method, in particular in the form of spectral clustering or Louvain.

To limit the search space, a cosine similarity, a term frequency and/or an inverse document frequency can be used as threshold value for the cluster formation in one embodiment.

The object is also achieved by an apparatus having features as described herein.

Embodiments are illustrated in connection with the figures that follow

Figure 1:
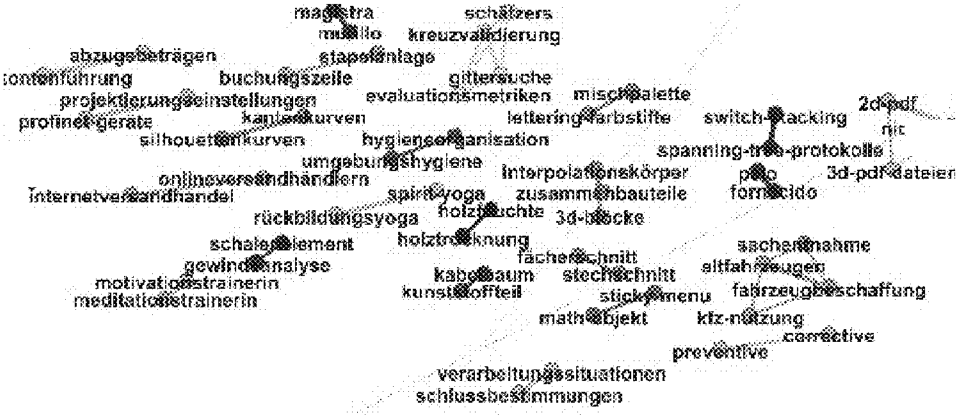
FIG. 1 shows an example of clusters of similar terms in a set of around 73500 documents.
Figures 2A, 2B:
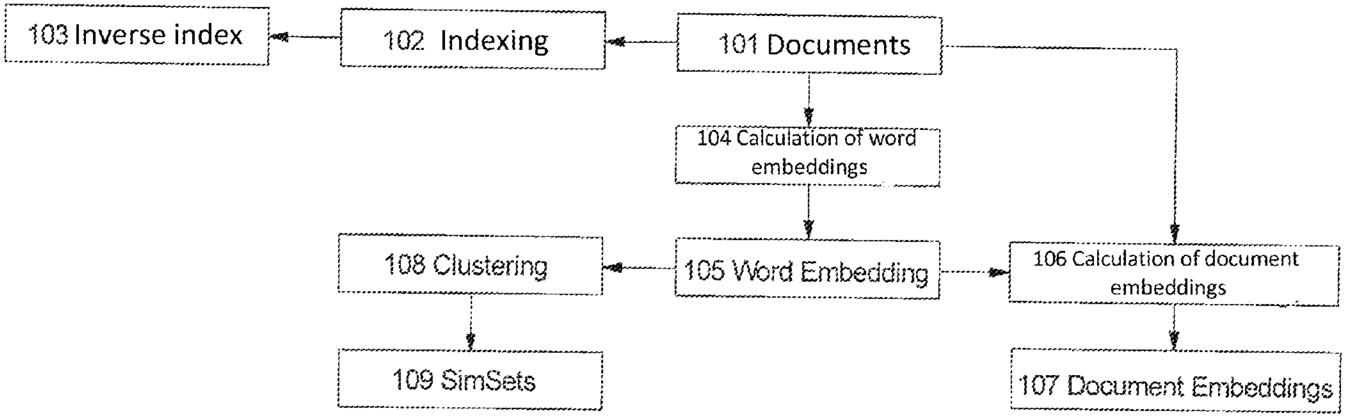
FIG. 2A shows a schematic depiction of an indexing phase in an embodiment of the method.
FIG. 2B shows examples of a word embedding and a document embedding.
Figure 5:
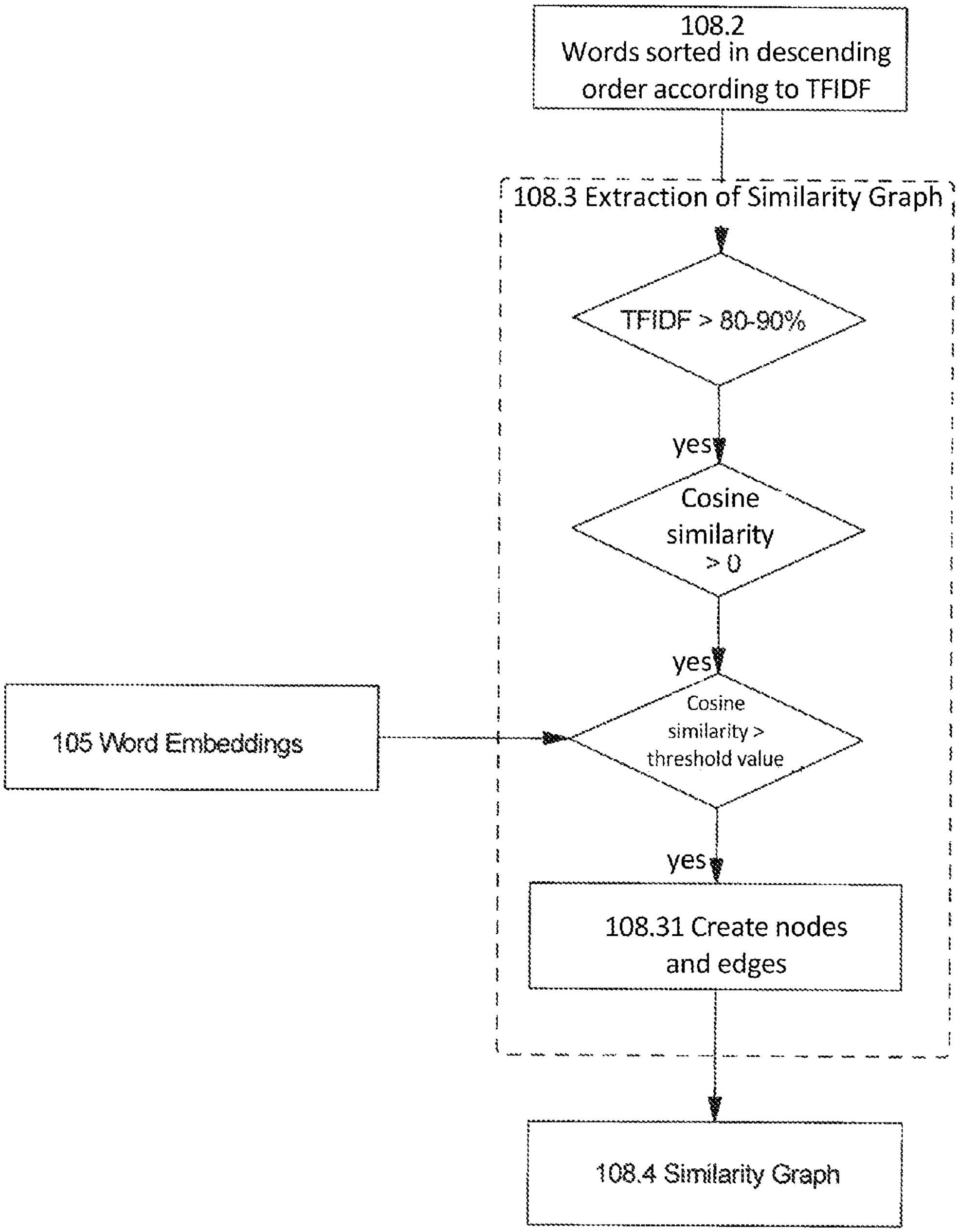
Figure 6:
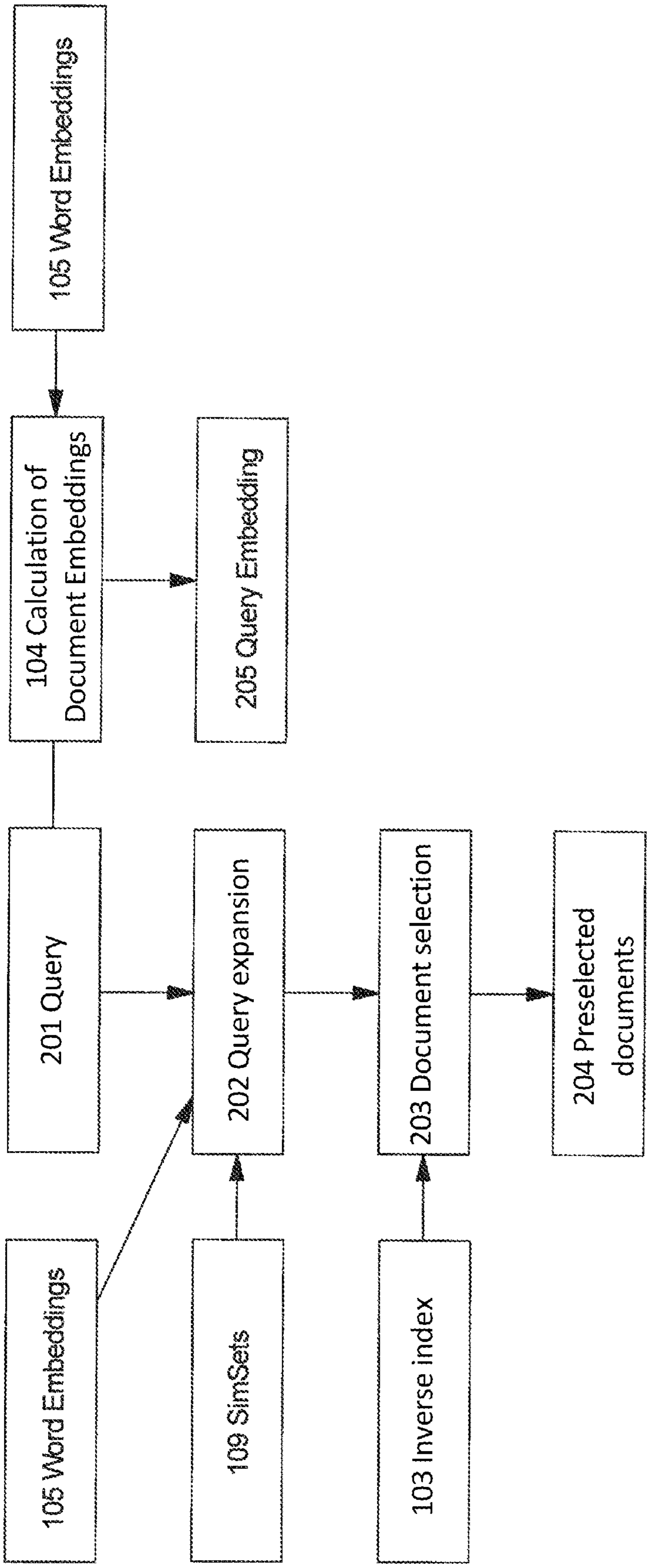
Figure 7:
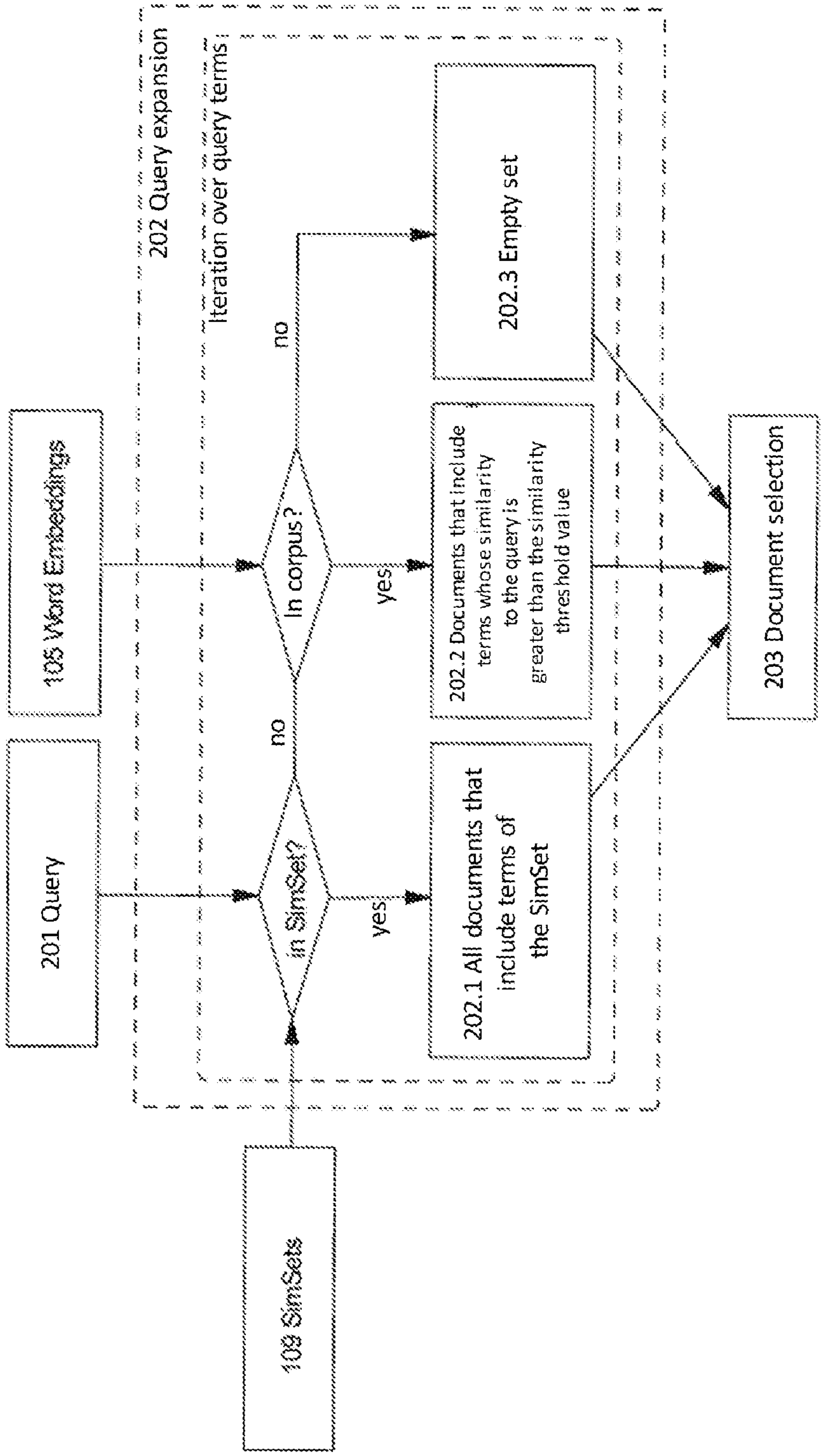
Figure 8:
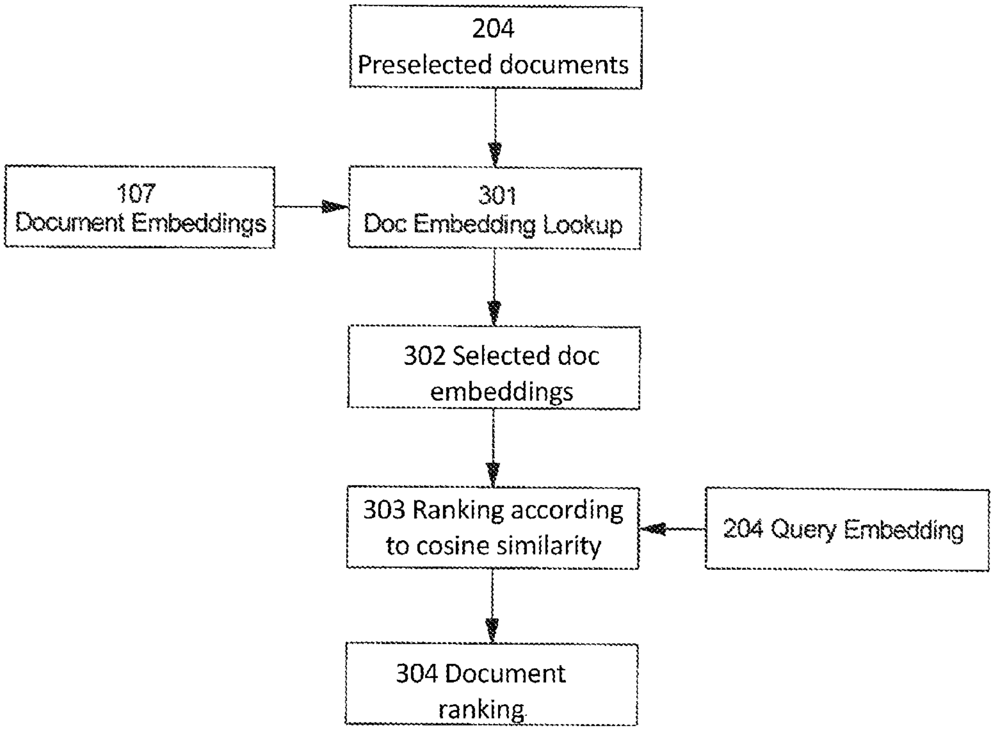

FIGS. 4A-C shows a determination of the most similar word embeddings in order to limit a similarity graph;

FIG. 4D shows an example of a SimSet for the example from FIG. 2B;

FIG. 5 shows a schematic depiction of the generation of a similarity graph for the purposes of a clustering method;

FIG. 6 shows a schematic depiction of a query preparation;

FIG. 7 shows a schematic depiction of a case distinction for a query expansion;

FIG. 8 shows a schematic depiction of a document retrieval.

DESCRIPTION OF THE INVENTION

The embodiments described below make use of the inherently known principle of word embeddings in documents.

It is assumed that documents and queries have already been prepared and are available as tokenized sequences of character strings in a standard character coding. Tokenizing means breaking down a text into individually processable components (words, terms and punctuation marks).

The problem is solved in two phases, the indexing phase and the query phase. The indexing phase is used for setting up efficient data structures; the query phase is used for searching for documents in these data structures. These two phases can optionally be complemented by a third phase, the recommendation phase.

Indexing Phase

The order of the processing steps in the indexing phase is shown schematically in FIGS. 2A-B.

The starting point is a set of documents 101, which are each available as tokenized sequences of character strings.

An indexing method 102 is used to calculate an inverted index 103 for these documents 101. This inverse index 103 allows the character strings included in the documents 101, such as e.g. words and/or terms, to be taken as a basis for fast access to all documents 100 that include given character strings.

Furthermore, inherently known methods 104 for calculating word embeddings 105, such as Word2Vec, GloVe, fastText, Gauss2Vec or Bayesian Skip-gram, are used to calculate word embeddings 105 for a low-dimensional, continuous word vector space from the documents 101.

Word embedding 105 is the collective term for a series of language modeling and feature learning techniques in natural language processing (NLP) that involve character strings from a vocabulary, in particular a lexicon, being mapped to vectors of real digits, which are referred to as word embeddings. In conceptual terms, it is a mathematical embedding of a space having many dimensions in a continuous vector space having a smaller dimension.

The word embeddings 105 are calculated in the depicted embodiment by using the CBOW model, which allows words to be predicted on the basis of context words. In another variant embodiment, instead of CBOW, a Skip-gram model can also be used, which allows context words to be predicted for a word. These calculation methods ensure that the word vectors of similar terms (terms that are frequently used in the same context) are arranged in spatial proximity to one another in the word vector space.

Document embeddings 107 are furthermore calculated 106 for the documents in the set of documents 101 by adding the word embeddings 105 of all character strings of the document for each document and normalizing said word embeddings with the number of words.

This avoids numerical overflows and dependencies of the document embeddings 107 on the document length, with the result that documents of different length can also still be compared with one another in a meaningful way.

Since documents that use the same or very similar words (i.e. character strings) are highly likely to deal with similar or related topics, adding their word embeddings 105 results in the document embeddings 107 thereof being arranged in close spatial proximity to one another in the document vector space.

FIG. 2B shows examples of a word embedding 105 and a document embedding 107.

The set of documents to be inspected in this example has only one sentence: "A police officer is an official".

This produces four vectors for the word embedding 105 and one vector for the document embedding 107.

In a further step, a clustering method 108 is used to determine groups of very similar character strings/words, which are referred to as SimSet groups 109 below, from the word embeddings 105. This step can also be performed beforehand, afterwards or at the same time as the step of document embedding 107 determination.

Since the number of potential groups of similar words is unknown, a nonparameterized clustering method 108 is used, for which the number of clusters does not need to be predefined. The methods that can be used include hierarchic methods, such as divisive clustering, agglomerative clustering, and density-based methods, such as DBSCAN, OPTICS and various extensions.

In one variant embodiment, it is also possible to use graph-based methods, such as spectral clustering and Louvain.

Figure 3:
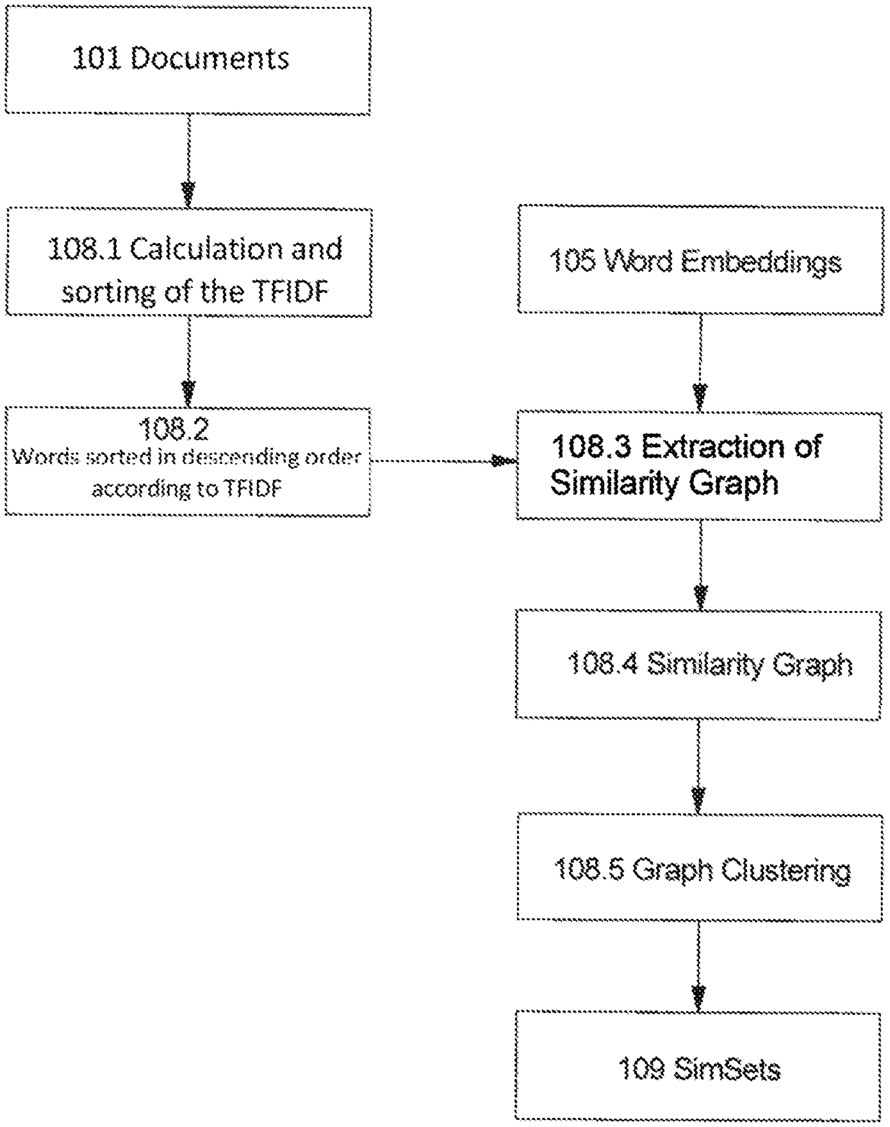
FIG. 3 shows a schematic depiction of the determinement of SimSet groups.

This variant embodiment for calculating SimSets 109 is shown in FIG. 3.

For the graph-based clustering of word embeddings 105, the similarities between all word embeddings 105 are regarded as weighted edges in a graph—referred to as a similarity graph—108.4, the nodes of which are formed by the word embeddings 105.

The weighting of the edges corresponds to the degree of similarity here. In an unsophisticated solution, this graph would be completely linked, since each word embedding has a distance or similarity to all others. The graph would therefore comprise $n*(n-1)/2$ edges, and clustering would need to involve searching an exponential set of clusters (potentially $2^n$ subsets). Determination of the optimum clusters would therefore be NP-heavy.

Two limitations can be used to drastically reduce both the number of nodes to be examined in the similarity graph and the quantity of edges to be taken into consideration.

Within the context of a search that takes into consideration not only the actual query but also similar words as well, it suffices to examine the character strings/words that are covered by a specific form of clusters—referred to as SimSets 109. These character strings/words should a) occur frequently in the amount of text (measured by the term frequency, TF, see Manning et al.),
b) have a high information content (measured by the inverse document frequency IDF, see Manning) and
c) be very similar to one another.

Since term frequencies in a corpus follow a power distribution, it suffices to satisfy the Pareto principle and to select those terms that comprise e.g. 80%-95% of all terms with the largest combined TFIDF (term frequency-inverse document frequency) (above cases a and b combined) of the corpus.

The specific value can be used as a significance threshold value in order to control the number of SimSets 109.

The similarity measurement of word embeddings 105 using cosine similarity (under c above) is shown in FIGS. 4A-C.

FIG. 4A shows the similarity of all word embeddings 105 to a given word embedding (dashed reference vector).

It is then possible to rule out e.g. all word embeddings 105 with negative similarity—cosine similarity <0, angle >90° (FIG. 4B, shaded half-plane).

A similarity threshold value could also be set, on the basis of cosine similarity, for similarity in a range from less than 0.87 to 0.7, and hence all word embeddings with an angle between 90° and 45° to 60° could be ignored as dissimilar (FIG. 4C, bold-shaded segments).

The word embeddings 105 that are most similar to the dashed reference vector remain, with an angle of no more than 30°-45°. These are then used as nodes of the similarity graph. The specific value of the similarity threshold value controls the size—in the sense of the number of terms—of the SimSets 109.

FIG. 4D shows the calculation of the cosine similarity for the set of examples from FIG. 2B. The shading in the individual cells corresponds to the shadings in FIGS. 4A-C.

FIG. 4D shows the numerical values for the cosine similarity, the arrangement being symmetrical. The similarity values on the main diagonal are naturally 1.

In a first step, the negative similarities (e.g. police officer—is) can be eliminated, which corresponds to the situation in FIG. 4B; i.e. only the positive half-plane is now examined.

Positive numerical values below a similarity threshold value (here 0.75) have a dark gray background and correspond to the narrowing of the angle range in FIG. 4C. The word "a" accordingly has e.g. only a slight similarity to the words "police officer", "is" and "official".

The word pairing "police officer" and "official" is therefore left as the relevant value above a similarity threshold value of 0.75 (and outside the main diagonals) with a similarity of 0.7533. These two words then form a SimSet group 109 for the example set of documents.

On the basis of this consideration (and with reference to FIGS. 3 and 5), the similarity graph 108.4 can be constructed as follows 108.3:

For every word in the set of documents 101, the combined TFIDF measure is calculated and sorted 108.1 and a reduced list of words (i.e. list of character strings) 108.2 sorted according to descending TFIDF is obtained therefrom.

To extract the similarity graph 108.3, these words/character strings are processed in order and, for each word/each character string with a TFIDF above the significance threshold value, the first decision process shown in FIG. 5 is performed. In the event of a negative result for one of the three comparisons, the respective character string, the respective word or the respective term is rejected (not shown in FIG. 5).

For each word/each character string, the word embedding 105 therefor involves determining the most similar words/character strings whose cosine similarity exceeds the similarity threshold value (second decision process in FIG. 5).

Corresponding nodes are created in the similarity graph for the applicable words, if these nodes do not yet exist, and are provided with a nondirectional edge, the weight of which corresponds to the specific cosine similarity between the words (step 108.3 in FIG. 5).

The similarity graph thus constructed includes all nodes with high TFIDF values that have a similarity to one another greater than/equal to the similarity threshold value. This graph has the property that all nodes that are in close spatial proximity in the word vector space are connected to one another in more finely meshed fashion than to nodes that are further away.

In the similarity graph 108.4, a graph-based cluster method, such as e.g. Louvain (*Fast unfolding of communities in large networks*". Blondel, Vincent D; Guillaume, Jean-Loup; Lambiotte, Renaud; Lefebvre, Etienne, *Journal of Statistical Mechanics: Theory and Experiment.* 2008 (10): P10008.arXiv:0803.0476. Bibcode:2008JSMTE..10..008B. doi:10.1088/1742-5468/2008/10/P10008 (last access Feb. 6, 2019)), can be used to identify clusters of words/character strings that have a high level of similarity to one another and are delimited from clusters of words/character strings to which they have lower similarities. These clusters of similar words are stored as SimSets 109 for further use.

In one variant embodiment, the SimSets 109 are made accessible for efficient retrieval by way of a further inverted index in order to be able to quickly identify whether a given word is included in a SimSet 109 and, if so, in which one. This can be done using the same mechanism (an inverted index) as when determining the documents that include a given word.

Query Phase

A search query for similar documents to the data determined in the indexing phase is responded to in two steps.

In the first step, query preparation, a query 201 available as a tokenized sequence of character strings is prepared by calculating a query embedding 205 for it, analogously to a normal document.

In the second step, retrieval, this query embedding 205 is compared against the document embeddings 107 of potentially possible, preselected documents 204, and these are sorted on the basis of their similarity, so as then to be in particular displayed and/or stored. This comparison is made with the SimSet groups 109 formed in the clustering method in order to quantitatively limit the number of document embeddings 107 to be compared. A ranking for the similarity of the documents is then automatically determined, displayed and/or stored.

Query Preparation

The flow of query preparation is shown in FIG. 6.

Query preparation consists of several parts: calculation of the query embedding 104 for a query 201, which takes place analogously to the calculation of the document embeddings 106 and yields a query embedding 205, a query expansion 202 and a document selection 203.

Since each document in the document vector space is similar to all others (but to different degrees), this also applies to the query embedding 104, which is constructed analogously. However, this would have the consequence that any query would always result in all documents being found, since a hard selection criterion is lacking.

To construct an appropriate selection criterion, a query expansion 202 is performed for the query 201. The query expansion (see FIG. 7) involves a distinction being drawn between a) query terms that occur in SimSets 109, b) query terms that do not occur in the SimSets but do occur in the corpus (i.e. of the documents 101), c) query terms that do not occur in the corpus. These also include misspelt query terms.

In case a), the query expansion involves the documents that include at least one of the SimSet terms (202.1 in FIG. 7) being preselected for each SimSet 109 that includes a query term. This approach admittedly has the disadvantage that documents that include terms with a lower degree of similarity are ignored. However, the advantage lies in a greatly reduced quantity of hits (analogously to a Boolean search) and the explainability of the hits by way of the terms of the SimSets.

In case c), an implementation by way of a variant embodiment that uses Word2Vec word embeddings can involve the preselected documents being set to the empty set (202.3 in FIG. 7).

In the case of the implementation by way of a variant embodiment that uses fastText word embeddings, no such preselection of the documents would be possible in cases b) and c), since this variant can deal with typing errors and "out-of-vocabulary" terms. To nevertheless achieve a reduction in the quantity of hits for these cases, the following consideration implies a solution:

As described, SimSets 109 consist of terms that 1) have a high TFIDF and 2) are very similar to one another.

This means that there can be individual query terms that are included in the corpus but not in a SimSet 109 and nevertheless have a similarity to a query term above the similarity threshold value.

In case b) and in the variant embodiment that uses fastText word embeddings, including in case c), the word embeddings 105 can be used to determine for these query terms the document terms that have a similarity above the similarity threshold value but are not included in the SimSets (202.2 in FIG. 7). These terms can then likewise be used for query expansion in order to make a preselection 203 of the documents.

The preselected documents 204 are transferred to the retrieval for comparison with the query embedding 205.

SimSets are used for the query expansion 202, if possible, in order to expand queries analogously to conventional semantic search (see FIG. 7). Since the expanded queries are used to retrieve document candidates from the inverted index, the method delivers an extended results set analogously to a conventional search, but without running into the described problem of unlimited retrieval that a purely word-embeddings-based approach would entail. This method therefore delivers extended but quantitatively limited results in comparison with a full-text search.

Retrieval

After the documents have been preselected 204 and the query embedding 205 has been calculated, the retrieval takes place as shown in FIG. 8.

To this end, the document embeddings 107 of the preselected documents 204 are compiled for said documents to produce the selected document embeddings 302. For each document embedding 302, the cosine similarity measure is used to calculate the cosine similarity to the query embedding and the documents are sorted according to descending similarity to produce the document ranking 304.

In one variant embodiment, the calculation can be parallelized by way of a known map reduce architecture so as to process even very large document sets efficiently.

Since, as described, the cosine similarity of a continuous vector space representation can also assume negative values, an additional filter criterion can be used during the document ranking 304 in order to limit the quantity of search hits further. Search results whose document embeddings have a negative cosine similarity to the query embedding can be filtered out, since they would be contrary to the query—so to speak. Since small cosine similarities of angles greater than 60° would also indicate very dissimilar vectors, it is—in a further variant embodiment of 303—furthermore expedient to filter the documents in 302 on the basis of a minimum similarity threshold value.

In a further variant embodiment, instead of the query embedding 205, it is also possible to use an embedding of user profiles that, analogously to a query 205 or document embedding 107, is able to be constructed from a description of the user or his interests.

Recommendation Phase

In a further variant embodiment, in an optional recommendation phase, instead of the query embedding 205, it is also possible to use any document embedding 107 for calculating the cosine similarity and for ranking the documents among one another so as to determine the documents that are most similar to a document.

The embodiments described here solve the technical problem firstly by not requiring term meanings to be predefined by a term model, as in the case of conventional search methods, but rather allowing them to be determined directly from the context of the words/character strings within the documents. Secondly, determinement of the SimSets 109 on the basis of the determined term meaning not only permits the quantity of documents requiring comparison at the query time to be efficiently limited but also permits the user to be provided with reasons for determining hits on the basis of the term similarities calculated in advance in the SimSets, so as to assist the traceability of the search results.

The effect of a conventional semantic search is the use of background knowledge in the form of term models, such as taxonomies, thesauri, ontologies, knowledge graphs, in order to deliver better search results than conventional full-text search engines.

The advantage of the embodiments described here is that they do not require this background knowledge and the meaning and similarity of terms can be learned solely from the document texts.

It can thus also be used in fields of application in which such background knowledge is not available or collection thereof would be too expensive.

It can be used immediately following installation and configuration without additional information.

Contrary to an unsophisticated use of word embeddings for implementing a semantic search function, the concept of SimSets allows the number of search hits to be filtered—analogously to a purely Boolean exclusion criterion—and hence the quantity of results to be limited for the user to the "most relevant" documents.

Adaptations to bypass the solution involve using pretrained models of word embeddings. General pretrained models are already available from Google, Facebook and others, for example.

Instead of calculating the word embeddings using Word2Vec, GloVe or fastText, KNET could be used to adapt the solution.

Opportunities for application of the embodiments can be found e.g. in content and document management systems, information systems, information retrieval systems of libraries and archives.

LIST OF REFERENCE SIGNS

101 documents
102 indexing method
103 inverted index
104 calculation of word embeddings
105 set of word embeddings
106 calculation of document embeddings
107 document embedding
108 clustering method
108.1 calculation and sorting of the TFIDF
108.2 sorting of the words in descending order according to TFIDF
108.3 extraction of similarity graph
108.31 creation of nodes and edges
108.4 similarity graph
108.5 graph clustering
109 SimSets/SimSet group (group of similar character strings/words)
201 query
202 query expansion
202.1 all documents included in SimSet group
202.2 documents including terms whose similarity to the query is greater than the similarity threshold value
202.3 empty set
203 preselection/document selection
204 preselected documents
205 query embedding
301 doc embedding lookup
302 selected doc embeddings
303 ranking according to cosine similarity
304 document ranking

The invention claimed is:

1. A method for pre-selecting and determining similar documents from a set of documents, wherein the set of documents have tokenized character strings, the method comprising the steps of:

a) calculating, with an indexing method, an inverted index for at least one subset of the set of documents, wherein the tokenized character strings are formed by tokenizing each document in the set of documents into respective character strings by breaking down text in each document into one or more of words, terms, or punctuation marks;

b) calculating word embeddings that represent the tokenized character strings of the at least one subset of the set of documents in a continuous vector space, wherein each word embedding comprises a respective vector corresponding to a respective tokenized character string, wherein contextual information of the surrounding tokenized character strings is encoded in each component of their corresponding vector, and wherein the resulting vectors for similar tokenized character strings have less spatial distance to each other than resulting vectors for non-similar tokenized character strings;

c) calculating a respective document embedding for each document in the at least one subset of the set of documents by adding, for each document of the at least one subset of the set of documents, the word embeddings of all of the tokenized character strings within that document and normalizing the sum of said word embeddings with the number of the tokenized character strings in that document;

d) calculating SimSet groups by clustering the previously calculated word embeddings that represent respective tokenized character strings extracted from documents of the at least one subset of the set of documents, wherein the SimSet groups are sets of tokenized character strings grouped based on vector similarity of the corresponding word embeddings, via an unsupervised, non-parameterized clustering algorithm, wherein for the calculation of the SimSet groups only the terms of the document set that are above an importance threshold based on the largest combined TFIDF are used, and wherein for the calculation of the SimSet groups a similarity threshold is further used to exclude dissimilar terms in which word embeddings have a cosine similarity of less than 0, resulting in SimSet groups, only comprising strings or words, that:

1) Frequently occur in the text based on a term frequency TF,

2) Have a high information content based on the inverse document frequency IDF, and 3) are similar to each other;

e) performing a query expansion, resulting in a set of expanded query terms comprising:

i) first query terms that occur in the SimSet groups that matches at least one query term of a received search query; or ii) second query terms that do not occur in the SimSet groups but do occur in at least one document of the at least one subset of the set of documents; or iii) third query terms that do not occur in any document of the at least one subset of the set of documents, including misspelled or phonetically similar variants;

f) determining a query embedding from said expanded query terms by summing and normalizing word embeddings of the expanded query terms;

g) retrieving, with the expanded query terms, preselected documents from the at least one subset of the set of documents using the inverted index, wherein the preselected documents are selected based on the expanded query terms and are used to limit the number of document embeddings to be compared in a similarity ranking; and h) comparing the query embedding with the document embeddings of the preselected documents to automatically determine a similarity score for ranking the similarity of the preselected documents and displaying or storing said preselected documents.

2. The method as claimed in claim 1, wherein the word embeddings are determined using a CBOW model or a Skip-gram model.

3. The method as claimed in claim 1, wherein the clustering method is a divisive clustering method or an agglomerative method.

4. The method of claim 1, wherein the clustering method is a divisive clustering method or an agglomerative method.

5. The method as claimed in claim 1, wherein the clustering method comprises a DBSCAN method or an OPTICS method.

6. The method as claimed in claim 1, wherein the clustering method is a spectral clustering method or a Louvain method.

7. The method as claimed in claim 1, wherein a cosine similarity, a term frequency and/or an inverse document frequency are used as a threshold value for the clustering of words or terms when calculating the SimSet groups.

8. The method as claimed in claim 1, wherein the clustering method is in the form of a density-based method.

9. The method of claim 1, wherein the clustering method is in the form of a spectral clustering method or a Louvain method.

10. The method of claim 1, wherein the tokenized character strings are words.

11. An apparatus for pre-selecting and determining similar documents from a set of documents, wherein the set of documents have tokenized character strings, comprising:

at least one processor; and at least one non-transitory computer readable medium comprising one or more instructions that, when executed by the at least one processor, cause the at least one processor to:

perform an indexing method to calculate an inverted index for at least one subset of the set of documents, wherein each word embedding comprises a respective vector corresponding to a respective tokenized character string, wherein the tokenized character strings are formed by tokenizing each document in the set of documents into respective character strings by breaking down text in each document into one or more of words, terms, or punctuation marks;

calculate word embeddings that represent the tokenized character strings of the at least one subset of the set of documents in a continuous vector space, wherein contextual information of the surrounding tokenized character strings is encoded in each component of their corresponding vector, and wherein the resulting vectors for similar tokenized character strings have less spatial distance to each other than resulting vectors for non-similar tokenized character strings;

calculate document embeddings, wherein a respective document embedding for each document in the at least one subset of the set of documents by adding, for each document of the at least one subset of the set of documents the word embeddings of all of the tokenized character strings, and normalizing the sum of the word embeddings with the number of the tokenized character strings in that document;

calculate SimSet groups by clustering the previously calculated word embeddings that represent respective tokenized character strings extracted from documents of the at least one subset of the set of documents, wherein the SimSet groups are sets of tokenized character strings grouped based on the vector similarity of the corresponding word embeddings, via an unsupervised, non-parameterized clustering algorithm, wherein when calculating SimSet groups, only the terms of the document set which are above an importance threshold based on the largest combined TFIDF are used, and for the calculation of the SimSet groups a similarity threshold is further used to exclude dissimilar terms when word embeddings have a cosine similarity of less than 0, resulting in SimSet groups only comprising strings or words that:

d1) frequently occur in the text based on a term frequency TF, d2) have a high information content based on the inverse document frequency IDF, and d3) are similar to each other;

perform a query expansion resulting in expanded query terms comprising:

i) first query terms that occur in the SimSet groups that include at least one query term of a received search query; or ii) second query terms that do not occur in the SimSet groups but do occur in at least one document of the at least one subset of the set of documents; or iii) third query terms that do not occur in any document of the at least one subset of the documents, including misspelled or phonetically similar terms;

calculate a query embedding from said expanded query terms;

retrieve with the query expansion preselected documents from the subset of documents using the inverted index, wherein the preselected documents are selected to quantitatively limit the number of document embeddings to be compared; and compare the query embedding with the document embeddings of the preselected documents to automatically determine a similarity score for each document and rank the documents accordingly and to display or store said preselected documents.

* * * * *